United States Patent
Norris

(10) Patent No.: US 8,567,564 B2
(45) Date of Patent: Oct. 29, 2013

(54) NON-INTERRUPTED OIL SUPPLY FOR GAS TURBINE ENGINE

(75) Inventor: James W. Norris, Lebanon, CT (US)

(73) Assignee: United Technologies Corporation, Hartford, CT (US)

( * ) Notice: Subject to any disclaimer, the term of this patent is extended or adjusted under 35 U.S.C. 154(b) by 1178 days.

(21) Appl. No.: 12/052,014

(22) Filed: Mar. 20, 2008

(65) Prior Publication Data
US 2009/0235630 A1 Sep. 24, 2009

(51) Int. Cl.
*F01D 25/18* (2006.01)

(52) U.S. Cl.
USPC .............. 184/6.11; 184/6; 184/6.2; 184/6.26; 184/6.4; 184/39; 184/55.2; 60/39.08; 60/39.091; 60/772; 60/778; 60/788

(58) Field of Classification Search
USPC ........... 184/6, 6.2, 6.12, 6.13, 6.23, 6.4, 6.28, 184/1.5, 106, 6.26, 39; 96/187; 123/196 R; 137/43, 202, 565.19
IPC .................. F02C 007/06; F01D 025/00,025/20
See application file for complete search history.

(56) References Cited

U.S. PATENT DOCUMENTS

| | | | |
|---|---|---|---|
| 2,745,357 A * | 5/1956 | Strayer | 137/565.19 |
| 2,831,490 A | 4/1958 | Simcock | |
| 2,930,188 A * | 3/1960 | Haworth et al. | 60/39.091 |
| 4,041,697 A | 8/1977 | Coffinberry | |
| 4,483,417 A * | 11/1984 | Mann | 184/55.2 |
| 4,576,001 A | 3/1986 | Smith | |
| 4,714,094 A | 12/1987 | Tovagliaro | |
| 4,741,155 A * | 5/1988 | McCarty | 60/772 |
| 4,947,963 A | 8/1990 | Aho | |
| 5,004,407 A | 4/1991 | Hutchison | |
| 6,267,147 B1 | 7/2001 | Rago | |
| 6,712,080 B1 | 3/2004 | Handschuh | |
| 6,996,968 B2 | 2/2006 | Peters | |
| 7,025,356 B1 | 4/2006 | Cheung | |
| 7,055,303 B2 | 6/2006 | Macfarlane | |
| 7,063,734 B2 | 6/2006 | Latulipe | |
| 7,104,918 B2 | 9/2006 | Mitrovic | |
| 7,144,349 B2 | 12/2006 | Mitrovic | |
| 2002/0007982 A1 * | 1/2002 | Howard | 184/6.2 |
| 2005/0279102 A1 * | 12/2005 | O'Connor | 60/778 |

FOREIGN PATENT DOCUMENTS

| | | |
|---|---|---|
| DE | 942234 C | 4/1956 |
| JP | 4005411 A | 1/1992 |
| JP | 7310808 A | 11/1995 |

OTHER PUBLICATIONS

EP Search Report dated Nov. 21, 2011.

* cited by examiner

*Primary Examiner* — Robert A Siconolfi
*Assistant Examiner* — San Aung
(74) *Attorney, Agent, or Firm* — Carlson, Gaskey & Olds, PC

(57) ABSTRACT

An oil supply system for a gearbox in a gas turbine engine includes a holding container which holds a quantity of oil to be delivered to a pump. The holding container includes a flexible barrier.

11 Claims, 1 Drawing Sheet

NON-INTERRUPTED OIL SUPPLY FOR GAS TURBINE ENGINE

BACKGROUND OF THE INVENTION

This application relates to an oil supply for components in a gas turbine engine, wherein a bias is maintained on an oil level to ensure oil delivery even when an associated aircraft is maneuvering.

Gas turbine engines are known, and typically include a fan delivering air to a compressor section. The air is compressed in the compressor section, and mixed with fuel in a combustion section. The mixed fuel and air are ignited, and the products of the combustion passed downstream over turbine rotors. The turbine rotors are driven to generate power for various components in the gas turbine engine, and to drive the engine.

One recent advancement in gas turbine engines is the use of a geared architecture to control the fan speed. A gearbox is associated with the fan. The gearbox includes oil film bearings, which require lubrication for proper operation.

Lubrication systems are associated with the gearbox, however, one concern with an oil supply system for an airplane is that with maneuvering of the aircraft, the orientation of oil supply chambers can be such that an oil pump may draw air, rather than oil.

SUMMARY OF THE INVENTION

In an oil supply system for a gearbox in a gas turbine engine, a chamber maintains a supply of oil to be delivered to an oil pump. The chamber is provided with a flexible barrier, and a supply of pressurized air, such that the oil is maintained at a location adjacent to a pipe leading to an oil pump.

These and other features of the present invention can be best understood from the following specification and drawings, the following of which is a brief description.

DETAILED DESCRIPTION OF THE PREFERRED EMBODIMENT

Figure 1:
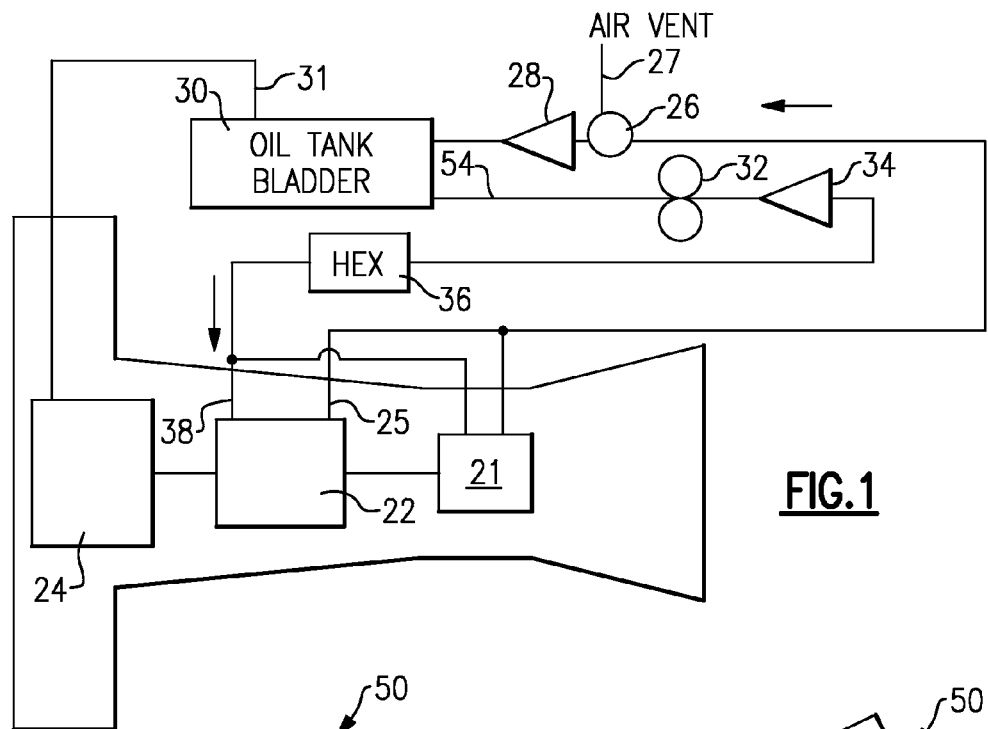
FIG. 1 schematically shows an oil supply system for a gearbox for a gas turbine engine.

A gas turbine engine 20 is illustrated in FIG. 1. A gearbox 22 for driving a fan section 24 is illustrated schematically. The remainder of the gas turbine engine 20 contains a compressor section, a combustion section and a turbine section. As known, the turbine section drives the gear box 22.

Figure 2A:
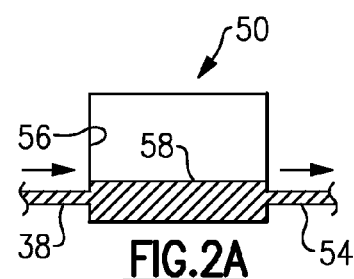
FIG. 2A shows a prior art container.

An oil supply line 25 leads to a deaerator pump 26. An air vent 27 passes air to the environment, from oil delivered from pump 26. The oil passes through a check valve 28, and into an oil container 30. The oil container 30 stores oil, and the oil is delivered through a pipe 54 to a pump 32. From the pump 32 the oil passes through a check valve 34, and to a heat exchanger 36. Downstream of the heat exchanger 36, a supply line 38 leads into the gearbox 22. The oil cycles through this path, and is desirably constantly supplied to the gearbox 22 to lubricate the oil film bearings within the gearbox. A problem in the prior art container 50 is illustrated in FIG. 2A. As can be seen, the supply line 38 leads into the container 50, and an outlet from container 50 provides an inlet 54 leading to the pump 32. The interior 56 of the chamber includes a supply of oil 58. When the container 50 is in a relatively horizontal orientation, the oil supply 58 is maintained high enough such that the inlet 54 will draw oil to pump 32, rather than air. As shown, oil may also be supplied to engine portion 21.

Figure 2B:
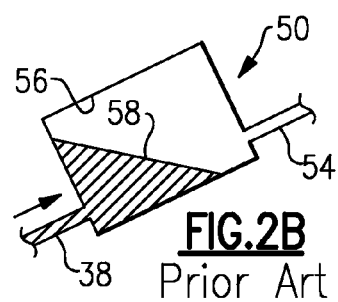
FIG. 2B shows a problem with the prior art container.

However, the gas turbine engine 20 is mounted on an aircraft, and the orientation of any component on the aircraft can change as the aircraft maneuvers. Thus, as shown in FIG. 2B, it is possible that the container 50 will have the position illustrated. In this position, the oil supply 58 has fallen due to gravity away from the inlet 54. The pump 32 will now draw air, which is undesirable.

Figure 3A:
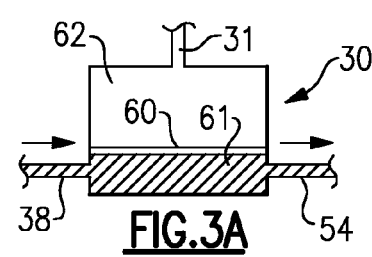
FIG. 3A shows an inventive container.
Figure 3B:
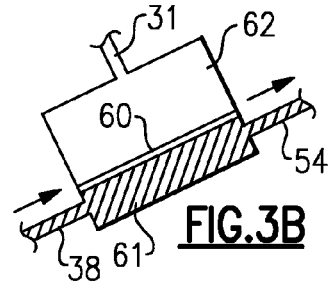
FIG. 3B shows the inventive container experiencing the same situation as shown in FIG. 2B.

FIG. 3A shows the inventive container 30. The supply line 38 supplies oil to the interior of the container, and to inlet 54 leading to the pump 32. A flexible barrier, which may be a bladder or diaphragm 60 is maintained atop the oil supply 61. Compressed air is delivered from the fan section or compressor section through line 31 to pressurize an area 62 above the diaphragm 60. Now, the diaphragm 60 is maintained against the oil supply level 61. As shown in FIG. 3B, should the container assume that posture shown in FIG. 2B, the diaphragm 60 will still ensure there is adequate oil supply for the inlet 54 to draw oil rather than air. The diaphragm can be made of any appropriate material.

Figure 4:
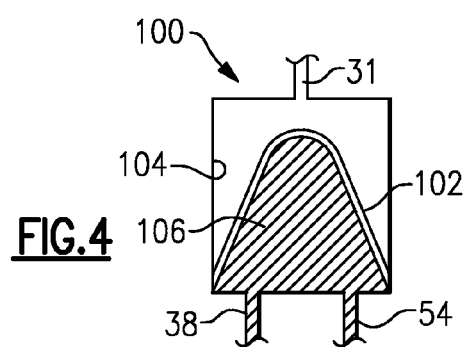
FIG. 4 shows an alternative embodiment.

An alternative embodiment 100 is illustrated in FIG. 4, wherein the flexible barrier is a bag 102, again formed of the flexible material. An air chamber 104 maintains a quantity of oil 100 at the location of the inlet 54.

While a heat exchanger 36 is positioned on the line 38 leading to the gear box 22, it is also possible that the heat exchanger could be moved to being on the line 25, or a second heat exchanger could even be utilized if necessary to more efficiently operate with the flexible members 102 and 60.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A gearbox and oil supply system for a gas turbine engine comprising:
   a gearbox;
   a holding container having a flexible barrier, with a connection to a source of pressurized fluid to be delivered to one side of said flexible barrier, and an opposed side of said flexible barrier communicating with a source of oil, for delivering oil downstream to a main pump;
   said main pump for delivering oil to the gearbox; and
   an inlet for delivering oil into said holding container, and an outlet leading from said holding container, said outlet providing an inlet for oil to the main pump.

2. The system as set forth in claim 1, wherein a deaerator pump removes air from the oil before it is delivered into the container.

3. The system as set forth in claim 1, wherein said gearbox drives a fan.

4. The system as set forth in claim 1, wherein the gearbox is for use on an aircraft.

5. The system as set forth in claim 1, wherein said flexible material is a diaphragm.

6. The system as set forth in claim 1, wherein said flexible material is a bag.

7. An oil supply system for use in a gas turbine engine comprising:
- a holding container having a flexible barrier defining an oil side of said container, and a source of pressurized fluid delivered to an opposed side of said flexible barrier from said oil side, said flexible container having an inlet for delivering oil into said holding container, and an outlet leading from said holding container; and
- said outlet providing an inlet for oil to a main pump.

8. The oil supply system as set forth in claim 7, wherein a deaerator pump removes air from the oil before it is delivered into the container.

9. The oil supply system as set forth in claim 7, wherein the system is on an aircraft.

10. The oil supply system as set forth in claim 7, wherein said flexible material is a diaphragm.

11. The oil supply system as set forth in claim 7, wherein said flexible material is a bag.

\* \* \* \* \*